United States Patent [19]
Sakamoto et al.

[11] Patent Number: 4,958,936
[45] Date of Patent: Sep. 25, 1990

[54] ELECTRIC THERMOMETER

[75] Inventors: Tamaki Sakamoto, Otokuni; Toshiyuki Kobayashi, Kyoto; Norihito Yamamoto, Shiga; Tamio Miyake, Otokuni, all of Japan

[73] Assignee: Omron Tateisi Electronics Co., Kyoto, Japan

[21] Appl. No.: 8,078

[22] Filed: Jan. 27, 1987

Related U.S. Application Data

[63] Continuation of Ser. No. 744,422, Jun. 13, 1985, abandoned.

[30] Foreign Application Priority Data

Jun. 13, 1984 [JP] Japan .................. 59-121032

[51] Int. Cl.$^5$ .................. G01K 15/00
[52] U.S. Cl. .................. 374/1; 374/163; 374/171
[58] Field of Search .............. 374/1, 158, 163, 171, 374/186, 209, 185; 324/63; 364/557; 338/28

[56] References Cited

U.S. PATENT DOCUMENTS

| | | | |
|---|---|---|---|
| 3,200,240 | 8/1965 | Hammel | 235/443 |
| 3,336,448 | 8/1967 | Alken | 235/442 |
| 3,493,730 | 2/1970 | Cilino et al. | 235/489 |
| 3,733,862 | 5/1973 | Killmeyer | 250/556 |
| 3,761,681 | 9/1973 | Evans | 235/445 |
| 4,022,063 | 5/1977 | West et al. | 364/557 |
| 4,050,052 | 9/1977 | Reichelt et al. | 338/28 |
| 4,161,880 | 7/1979 | Prosky | 374/171 |
| 4,276,536 | 6/1981 | Wisnia | 338/28 |
| 4,288,853 | 9/1981 | Uesugi | 364/557 |
| 4,304,991 | 12/1981 | Weber | 235/442 |
| 4,317,367 | 3/1982 | Schonberger | 374/158 |
| 4,531,842 | 7/1985 | Schonberger | 374/1 |
| 4,537,516 | 8/1985 | Epstein | 374/1 |

Primary Examiner—Thomas B. Will
Attorney, Agent, or Firm—Foley & Lardner, Schwartz, Jeffery, Schwaab, Mack, Blumenthal & Evans

[57] ABSTRACT

An electronic thermometer includes a temperature sensing assembly incorporating a temperature sensor element, and a measuring and processing unit for determining and displaying the temperature, wherein the temperature sensing assembly and the measuring and processing unit are physically separable from each other. The temperature sensing assembly includes a code for recording information of the temperature characteristic or the like of the incorporated temperature sensor element. With the aid of the code, the measuring and processing unit is capable of correcting nonuniformity in the characteristic of the mutually exchangeable temperature sensing assemblies, to thereby assure a correct reading.

8 Claims, 2 Drawing Sheets

ELECTRIC THERMOMETER

This application is a continuation of application Ser. No. 744,422, filed Jun. 13, 1985 now abandoned.

BACKGROUND OF THE INVENTION

1. Field of the Invention

The present invention generally relates to an electronic thermometer. More particularly, the invention concerns an electronic thermometer which is so arranged as to correct measured temperature in consideration of temperature characteristic of a temperature sensor element incorporated in a temperature sensing unit or assembly which is adapted to be disconnectably coupled to a main body of the thermometer so as to be exchangeable with another temperature sensing unit or assembly.

2. Description of the Prior Art

There has therefore been known an electronic thermometer which comprises a temperature sensing unit or assembly incorporating a thermosensitive element or temperature sensor element and a measuring and processing unit for measuring or determining the temperature of an object to be measured such as a human body on the basis of an electric signal available at the output of the temperature sensor element, wherein the latter is disconnectably combined with the measuring and processing unit so that the temperature sensing unit or assembly can be exchanged with another sensing assembly. In this type of thermometer, correction circuits are provided in the temperature sensing assembly and the measuring/processing unit, respectively. Owing to remarkable advances in the electronic technology in the recent years, the temperature sensing assembly can be manufactured at such very low cost that it may be discarded after use, a disposable thermometer, so to say, unless a correction or compensating circuit is required. In reality, the disconnectable or separatable temperature sensing assembly of this type tends to be used on the disposable basis in hospitals or the like where a large amount of temperature measuring and processing tasks are to be dealt with.

However, for the accurate temperature measurement, the correction circuit for correcting the measured temperature in view of the temperature characteristic of the sensor element as used is indispensably required. In this conjunction, the hitherto known thermometer including the correction or compensation circuits in the temperature sensing assembly and the measuring processing unit, respectively, is disadvantageous in that the circuit configuration such as that of the detection circuit is very complicated, giving rise to a problem that the thermometer is too expensive to be disposable.

SUMMARY OF THE INVENTION

An electronic thermometer according to the present invention comprises a temperature sensing assembly incorporating a temperature sensor element (thermosensitive element) and a measuring and processing unit which includes a measuring circuit for determining the temperature on the basis of a signal produced by the temperature sensor element and a display unit for displaying the determined or measured temperature, wherein the temperature sensing assembly is adapted to be separatably or disconnectably combined with the measuring and processing unit.

The temperature sensing assembly includes code means for recording the information of temperature characteristic or the like of the temperature sensor element, while the measuring and processing unit includes reader means for reading the information of temperaure characteristic or the like of the sensor element from the code means when the temperature sensing assembly is combined or connected to the measuring and processing unit, and means for compensating correctively the measured temperature in consideration of the temperature characteristic as read out from the code means.

Since the measured temperature (i.e. temperature determined by the measuring and processing unit) can be corrected in consideration of the temperature characteristic or the like factors of the temperature sensor element without necessity for installation of the correction circuit in the temperature sensing assembly, the mutually exchangeable temperature sensing assemblies can be realized at such low cost as to be disposable, while assuring the temperature measurement with an improved accuracy. Accordingly, it is an object of the present invention to provide an electric thermometer which is capable of performing correction on the measured temperature in accordance with the temperature characteristic or the like of the temperature sensor element as employed.

Another object of the present invention is to provide the electronic thermometer of the aforementioned type in which no correction circuit is required to be installed in the temperature sensing assembly.

Still another object of the invention is provide the electronic thermometer of the aforementioned type in which the temperature sensing assembly can be manufactured so inexpensively as to be disposable.

A further object of the invention is to provide the electronic thermometer of the aforementioned type which is capable of performing temperature measurement at a high accuracy with an enhanced reliability.

The above and other objects, features and advantages of the invention will be more apparent upon consideration of the following description of the preferred embodiment made in conjunction with the accompanying drawings.

DESCRIPTION OF THE PREFERRED EMBODIMENTS

Now, the invention will be described in conjunction with exemplary embodiments thereof by referring to the accompanying drawings.

Figure 1:
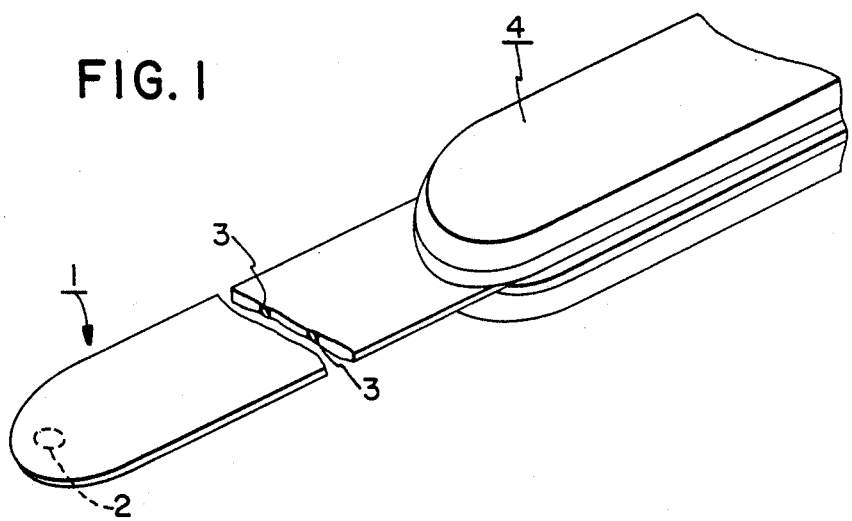
FIG. 1 is a schematic perspective view showing a thermometer according to an exemplary embodiment of the invention.
Figure 2:
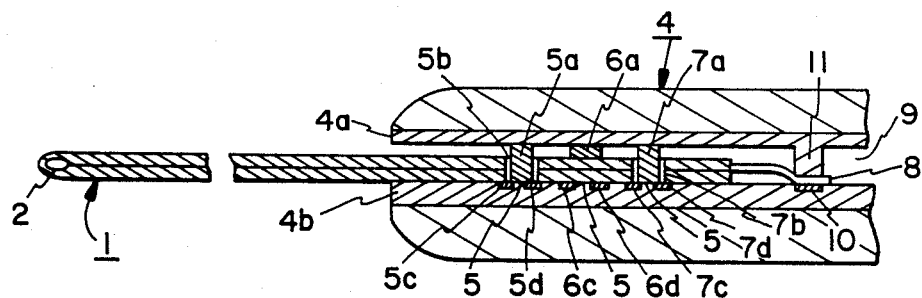
FIG. 2 is a schematic sectional view of the thermometer shown in FIG. 1.
Figure 3:
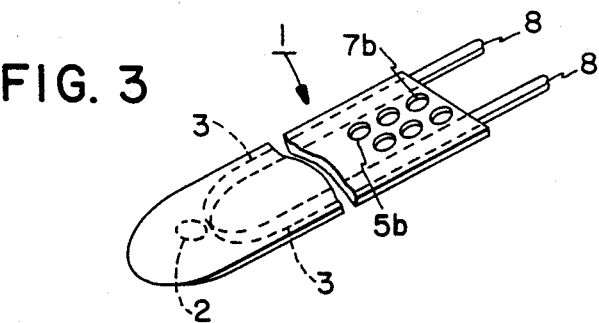
FIG. 3 is a schematic perspective view showing a temperature sensing assembly according to an exemplary embodiment of the invention.

Referring to FIG. 1 and 2, a refernce numeral 1 generally denotes a temperature sensing assembly realized in the form of a tongue-like sheet. The temperature sensing assembly 1 includes a temperature sensor element 2, lead wires 3 for taking out an electric signal from the sensor element and lead terminals 8 for external connection. The temperature sensing assembly 1 may be constituted by bonding together a pair of electrically insulation films, both or one of which has an inner surface printed with electric conductor patterns. The temperature sensor element 2, such as a thermistor, is enclosed within the laminated insulation films which are insulatingly sealed off at least along the periphery. Referring to FIG. 3, it will be seen that the sheet-like temperature sensing assembly 1 is provided with perforations 5b, 7b formed in a region located on the side of the lead terminals 8 and representing an encoded temperature characteristic of the temperature sensor element 2 as employed. A reference numeral 4 generally denotes a main body of the electronic thermometer. The temperature sensing assembly 1 is held by the main body 4 in a sandwiched state in the manner illustrated in FIG. 2. The main body 4 is composed of a pair of insulation members 4a and 4b, wherein the insulation member 4a is provided with electrically conductive rubber studs 5a, 6a and 7a at predetermined locations, while the insulation member 4b is provided with electrically conductive patterns, as will be described below. A reference numeral 5 generally designates a reader unit which includes the electrically conductive rubber studs 5a, 6a and 7a and the electrically conductive patterns 5c, 5d, 6c, 6d and 7c, 7d which constitute a code reader circuit in cooperation with the electrically conductive rubber studs 5a, 6a and 7a. It is to be understood that the components constituting the reader unit 5 may be increased or decreased in number, as occasions require. A reference numeral 9 denotes a connector or switch portion which includes on electrically conductive pattern or pad 10 and a projecting stud 11 which serves to bring the conductive pattern 10 in electrical contract with the lead terminals 8 in the state where the temperature sensing assembly 1 is held by the main body 4 in the sandwiched manner.

Figure 4:
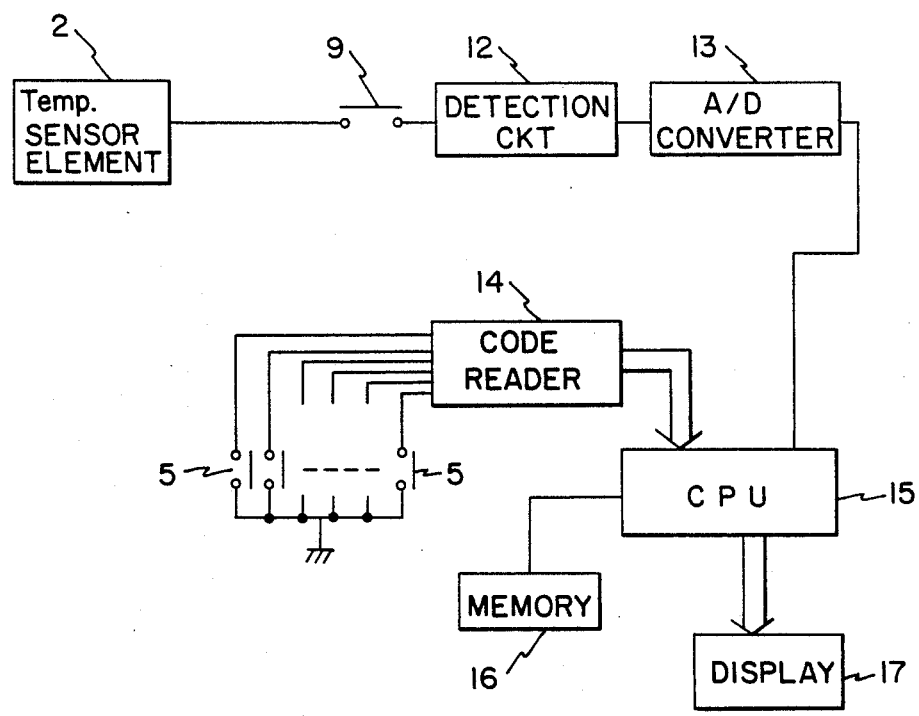
FIG. 4 is a block diagram showing a general arrangement of an electric system employed in the thermometer according to an embodiment of the invention.

FIG. 4 shows in a block diagram a general arrangement of an electrical system of the electronic thermometer according to an exemplary embodiment of the invention. In FIG. 4, reference numeral 12 denotes a detection circuit for detecting the output signal derived from the temperature sensing element 2 as an analogue quantity. A numeral 13 denotes an analogue-to-digital converter which functions to convert the analogue signal outputted from the detection circuit 12 into a corresponding digital signal. A reference numeral 14 denotes the aforementioned code reader circuit which serves to output the code (encoded by the perforations formed in the temperature sensing assembly 1) read by the reader unit 5 as a digital data signal. A central processing unit or CPU 15 are supplied with the digital signal from the A/D converter 13 and the digital signal outputted from the code reader circuit 14. A memory 16 is connected to the CPU 15 for storing therein a data table referred to upon arithmetic determination of the temperature by the CPU 15 on the basis of the signal originating in the temperature sensor element 2. Finally, a reference numeral 17 denotes a display unit to which data represenstative of the temperature determined arithmetically by the CPU 15 is supplied to be displayed.

Next, description will be made of the operation of the electronic thermometer according to the illustrated embodiment of the present invention. The temperature sensing assembly 1 is held by the main body 4 in the sandwiched manner. In this state, the electrically conductive rubber studs 5a and 7a are inserted in the in the perforations 5b and 7b, respectively, formed in the temperature sensing assembly 2 and indicative of the encoded temperature characteristic or the like of the temperature sensor element 2. As the consequence, the electrically conductive pattern 5c is connected to the pattern 5d, with the patterns 7c and 7d being connected to each other, whereby corresponding closed circuits are formed. Obviously, the electrically conductive rubber stud 6a located in opposition to the region where no perforation is formed is resiliently compressed, as is shown in FIG. 2. Consequently, no connection is established between the conductive patterns 6c and 6d, forming an open circuit, so to say. The code reader circuit 15 supplied to the CPU 15 a digital data signal (e.g. "0101") corresponding to the aforenoted closed circuit states and the open circuit.

On the other hand, since the lead terminals 8 are brought into contact with the electrically conductive patterns 10 under pressure of the projecting member 11, the output signal of the temperature sensor element 2 is detected by the detection circuit 12. The analogue signal outputted from the detection circuit 12 is converted into the digital signal through the A/D converter 13, the digital signal in turn being supplied to the input of the CPU 15.

The CPU 15 supplied with the data detected by the temperature sensor element 2, as well as data representative of the encoded temperature characteristic of the like of the temperature sensor element 2, arithmetically determines the temperature on the basis of this data with the aid of temperature data read out from the table stored in the memory 16. The temperature determined arithmetically is subsequently corrected by utilizing data for correction also stored in the memory 16 and read out in accordance with the encoded data of temperature characteristic or the like. More specifically, in case a thermistor or the like is employed as the temperature sensor element, by way of example, deviation of the resistance of such element from a standard temperature resistance curve (i.e. standard temperature characteristic curve) is previously encoded and recoded in the temperature sensing assembly in the form of perforation array unique to that sensor element, wherein the calculated temperature data is corrected by the CPU 15 with respect to the deviation by reading the proper correction data from the memory 16 in accordance with the code read from the temperature sensing assembly through the code reader circuit 14, whereby the temperature measurement can be accomplished with an improved accuracy.

In connection with the temperature sensor element, it should be understood that the invention is never restricted to the use of the thermistor.

Further, the temperature characteristic coding method as well as the code reading method may be practiced in other ways than the illustrated one without departing from the scope of the invention. For example, there may be adopted a magnetic code recording and reading system, a bar code recording method combined with an optical reader device, a perforation code array in combination with photoelectrical switch type code reader, a color code recording and reading method, or recording and reading of marks of different sizes and others.

Additionally, in order that several temperature sensor elements of different types inclusive of thermistor, thermosensitive diode, ceramic element and the like may be used in carrying out the invention, the amounts for correction corresponding to these different sensor elements can be encoded and recorded in the temperature sensing assemblies incorporating these sensor elements, respectively, wherein the code may be used to address the location of the memory where the associated data for correction is stored.

In the foregoing, the invention has been described in conjunction with the exemplary embodiment believed to be presently preferred. It will however be appreciated that modifications and variations will readily occur to those skilled in the art without departing from the spirit and scope of the invention.

What is claimed is:

1. An electronic thermometer, comprising:
   (a) temperature sensing means incorporating a temperature sensor element;
   (b) temperature measuring and processing means including a measuring unit for determining temperature on the basis of a signal output from said temperature sensing means and a display unit for displaying the temperature determined by said measuring unit;
   (c) code means in the form of a plurality of perforations for recording information of a temperature characteristic of said temperature sensor element in said temperature sensing means;
   (d) reading means including resilient contacting means for reading said information of the temperature characteristic from said code means wherein at least some of said resilient contacting means pass through said perforations;
   (e) means for correcting the temperature determined by said measuring and processing means in accordance with the information of the temperature characteristic read out from said code means; and
   (f) means for switching on and off said reading means when said temperature sensing means is physically combined with said measuring and processing means.

2. An electronic thermometer according to claim 1, wherein said temperature sensing means comprises laminated insulation films having at least one inner surface printed with an electrically conductive pattern of lead wires, said temperature sensor element being embedded therein, said insulation films being sealed at least along a pheripheral edge thereof.

3. An electronic thermometer according to claim 2, wherein said temperature sensing element comprises a thermistor.

4. An electronic thermometer according to claim 1, wherein said temperature sensing means includes lead terminals provided at a read end portion and electrically connected to said temperature sensing element, said lead terminals being inserted into said measuring and processing means for establishing electrical connection thereto.

5. An electronic thermometer acccording to claim 4, wherein said measuring and processing unit includes electrically conductive means for establishing said electrical connection when said lead terminals of said temperature sensor element are held by said measuring and processing means in a sandwiched manner.

6. An electronic thermometer according to claim 1, wherein said measuring and processing means includes a detection circuit for detecting an electrical signal outputted from said temperature sensing element as an analogue quantity, an analogue-to-digital converter for converting said analogue signal outputted from said detection circuit into a corresponding digital signal, a code reader circuit for reading the code of said temperature sensing means to thereby produce a corresponding digital signal, and a central processing unit supplied with said digital signals from said analogue-to-digital converter and said code reader circuit to thereby correct the measured temperature by referring to temperature data table stored in a memory.

7. An electronic thermometer according to claim 1 wherein said perforations form a code in accordance with the quantity and position thereof.

8. An electronic thermometer according to claim 1 wherein said contacting means comprises a conductive rubber layer.

* * * * *